United States Patent Office 3,289,318
Patented Dec. 6, 1966

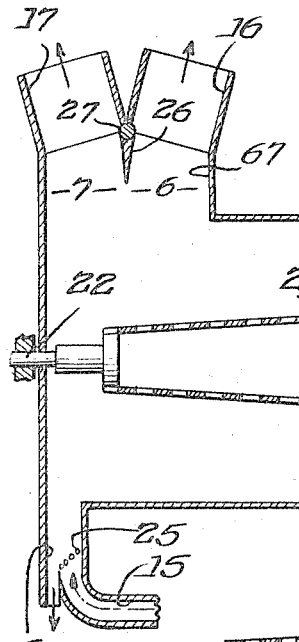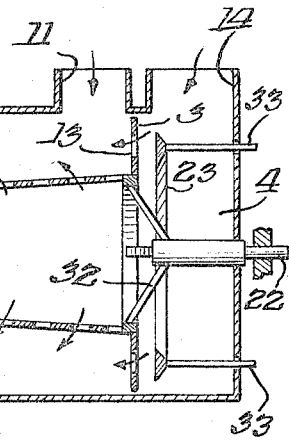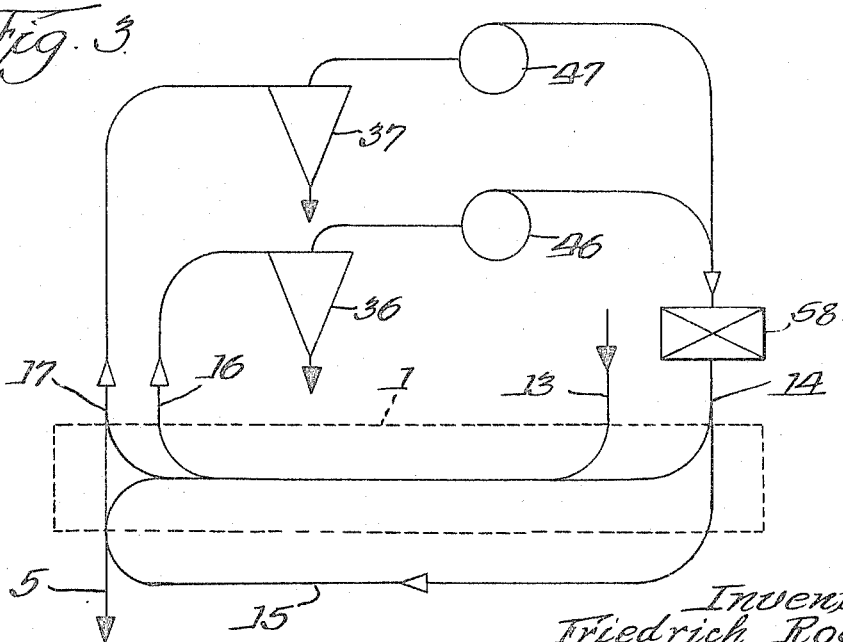

3,289,318
DRYING LIGHTWEIGHT LOOSE MATERIAL
Friedrich Roos, Rotensee, near Bad Hersfeld, Germany, assignor to Benno Schilde Maschinenbau AG., Bad Hersfeld, Germany, a corporation of Germany
Filed Dec. 5, 1963, Ser. No. 328,284
7 Claims. (Cl. 34—182)

The invention disclosed herein is concerned with improvements relating to the drying of lightweight loose material. Wood chips or shavings, for use in the production of composite sheets or boards, may be mentioned merely to give an example of a material that may be processed according to the invention; it being understood, of course, that this is not intended to indicate an inherent limitation as the invention may very well be used in connection with other materials.

The improvements according to the invention are incorporated in a device comprising a drum-like housing in which is rotatably disposed a tubular member the diameter of which diminishes progressively from the feed end to the discharge end of the housing and the wall of which is provided throughout its length with holes formed therein for the outflow of the drying medium, for example, air, fed thereinto axially thereof, the material to be processed being conveyed through the housing along a spiral path about the tubular member, by the action of the air flowing through said holes, the coarse material particles being discharged downwardly at the end of the housing and the remaining material particles being upwardly removed by suction and being outside of the housing separated from the air which is circulated in the closed cycle.

The conveying speed or the time of treatment of the material in the housing depends aside from the properties and the initial condition thereof, mainly upon the flow velocity of the air in the direction in which the material is being conveyed. The speed of rotation of the tubular member may be adjusted by known and suitable means.

It was now found that the material conveying speed can be increased or, conversely, its treatment time shortened, without necessarily increasing the flow velocity of the air stream uniformly along the entire path thereof, which in some situations disturb the circulation of the air in a closed circuit or cycle. According to the invention, a part of the air flowing into the housing is for this purpose diverted and introduced in adjustable amounts into the part or section of the housing lying first in the direction of material conveyance, thereby increasing in conveying direction the initial speed of the material supplied to the first section of the housing and thereby also increasing its average conveying speed.

Since the amount of the air entering into the remaining housing sections decreases in the proportion in which the amount of the air entering into the first housing section increases, there will result in the last housing sections some quieting of the strongly turbulent flow, thus producing favorable conditions for a further measure and feature of the invention. This measure resides in that material particles of a size less than a predetermined size, are by suction removed from the housing in a first negative pressure zone, while the remaining particles, except the coarse particles, are removed by suction of higher negative pressure in a second zone which is in the conveying direction directly adjacent the first zone. The separation of the material into fractions thereof, which was effected until now outside of the housing, in a special separator requiring its own power supply, is thus effected in the housing, thereby resulting in considerable savings with respect to space, materials and energy.

In order to additionally introduce an adjustable partial amount of air into the first housing section, there are provided, in a forwardly facing end wall of the housing, which also forms the rear wall of an air distribution chamber, passages for the air, the flow volume of which can be continuously varied, such passages being disposed about the air inflow opening positioned centrally of the wide end of the axially extending tubular member. Accordingly, the partial amount of air can flow directly axially, that is, in conveying direction, into the first section of the housing and, with appropriate adjustment of the flow volume of the passages, preferentially into an upper or into a lower housing sector. In the first case, the material path is shortened and in the second case it is lengthened, but the formation of dead spaces is at the same time impeded in the lower housing sector.

It will be sufficient in some cases to arrange in the central axially extending tubular member, approximately at a line coinciding with the end of the first housing section, a choke or damper for continuously varying the operatively effective cross-sectional area. It is understood that this measure, which preserves for the additional or diverted amount of air the radially directed flow and velocity component, is less efficient than the first explained measure which may, however, be combined therewith.

There are provided, for the removal, by suction, of fractions of the material particles from the housing, suction discharge zones which are separated by a partition which is movable in material conveying direction and laterally to itself, and for each of the suction zones is provided a material separator and a blower for circulating the air, the speed of rotation (r.p.m.) of the two blowers being by suitable and approved means continuously variable in accordance with a constant average value derived from the negative pressures which are to be adjusted for the respective suction discharge zones. The lengths of the suction discharge zones, that is, the operatively effective relative cross-section thereof, is adjustable by means of the movable partition.

A sharp classification according to particle size is in the case of drying and separating wood chips or shavings for the production of composite boards or plates, less important than a given ratio between the amounts of the two size classes, and it is, therefore, advantageous to make the pressure difference between the two suction zones continuously variable, again at a constant average value of the negative pressures, depending upon a desired amount ratio of the particles removed by suction from the two zones. For this purpose may be used, for example, a known and suitable differential weigher system which is in known manner adjustable to a given amount ratio as a desired value, whereby deviations from such desired value are utilized as values for the regulation of the speed of revolution of the blower motors, in such a manner, however, that the total output power of the blowers remains constant. The fractionized material removal by suction, according to the invention, must not be confused with the known suction removal of dust and finest material particles, although the latter can, of course, be effected by the use of the invention. Dust and finest particles, that is, particles which cannot be used for making the end product, are appropriately removed by suction at a region lying ahead of the suction zones, at a part of the housing which is at the respective area perforated and enclosed by a jacket surrounding the housing.

Further details and features of the invention will appear from the description which is rendered below with reference to the accompanying drawings.

FIG. 1 is a longitudinal sectional view of the device according to the invention;

FIG. 2 shows on the same scale a part of FIG. 1 provided with a modification; and FIG. 3 represents the circulation of the air in a closed circuit or cycle.

Referring now to FIG. 1, numeral 1 indicates the housing in which is disposed the centrally axially extending tubular member 2, such member being journalled for rotation at 22 and 22'. Suitable known means for rotating the tubular member are of course provided. This tubular member 2 is over its entire length provided with holes or openings 12 formed therein, through which is discharged the air entering thereinto at the right hand end from a distributing chamber 4. Accordingly, the air flows through the housing 1, in gradually increasing amount, from the right to the left, that is, in the direction of the material conveying motion. The diameter of the central tubular member 2 decreases uniformly in the direction of the discharge end of the housing 1 and the volume of the flowing air therefore remains over the length of the housing substantially constant. The central tubular member 2 which is constructed so as to be self-supporting, is at its wide end connected with the shaft 22' by means of struts 32. The annular wall 3 which may be fixedly connected with the tubular member 2, defines the rearward end of the operatively effective part of the housing 1 and also forms the rear wall of the air distribution chamber 4. Such wall 3 is provided with passages 13 which are disposed about the central inflow opening of the tubular member 2. Ahead of these passages 13, within the distribution chamber 4, is provided a ring 23 which may be shifted axially by means of links 33, 33', thus making it possible to adjust the volume of air therethrough, the air being supplied at 14. A rotary valve could be used in place of the ring 23, but it would limit the maximum total cross-sectional area of all passages 13 to almost half of what can be obtained with the use of the ring 23 which operates in the manner of a shutter or diaphragm. The link members 33, 33' may be made articulated in known and suitable manner, instead of being fixed connected with the ring 23, as shown in FIG. 1, and the ring 23 can in such case be spaced from the passages 13 in the lower sector more or less of the spacing thereof in the upper sector, and vice versa, so as to selectively admit air in larger or smaller partial amounts to either the upper or lower housing sector, for example, to admit to the upper housing sector a greater or smaller partial amount of air which is supplied through the conduit 14 to flow into the distribution chamber 4.

At the discharge end of the housing 1 is provided a discharge conduit 5 through which the coarse material particles are discharged by gravity. However, since lighter particles may adhere to the coarse particles, air taken from the circulation (FIG. 3) is blown through the conduit 15 obliquely into the conduit 5 through a screen 25 to prevent clogging of the conduit 15 by coarse material particles. On top of the housing 1, at the discharge end thereof, is disposed a hood-like extension 67 forming two tubular conduits 16 and 17 and being below these conduits provided with a partition 26. This partition is rearwardly and forwardly rotatable about the axis 27 in the direction of the material flow. The space below the hood 67 which lies in the material flow direction ahead of the partition 26, forms the first suction zone 6 which operates with low negative pressure, and the space lying in back of the partition 26 forms the suction zone which operates with higher negative pressure.

As shown in FIG. 3, each of these zones 6 and 7 (conduits 16, 17) is over a suction line connected with a separator as indicated respectively at 36 and 37 and the latter are respectively connected each with a circulation blower as indicated at 46 and 47 for recirculating the drying medium (air). The blowers 46 and 47 direct the air into a common suitable and known air heater 58 from which it flows under pressure into the conduit 14 (see also FIG. 1). Suitable and known motor means may be provided for the blowers 36 and 37.

The material which is to be dried is supplied through the hopper 11 (FIG. 1) to the section of housing 1 lying first in the material feed or conveying direction. The material is conveyed through the housing along a helical line by the action of the air flowing from the holes 12 of the slowly rotating tube 2 and also flowing through the holes 13. If there were not provided any holes 13 in the wall 3, or if these holes were closed, the material would be only very slowly accelerated in the first housing section so that it would attain its maximum conveying speed just shortly ahead of the discharge end of the housing. The more the holes 13 are opened, the more will the material be accelerated in the conveying direction and the higher will be its average conveying speed which is important for the treatment time. Upon reaching the discharge end, the particles of a size less than a predetermined size are taken up by the lower suction force obtaining at the zone 6, transported through the conduit 16 to the separator 36 in which they are separated from the drying medium, the separated air being by the action of the blower 46 conducted to the air heater 58 for recirculation. However, particles of a size exceeding this predetermined size, except the coarse particles which are downwardly discharged through the conduit 5, are acted on by the higher suction obtaining in the zone 7, for transport through the conduit 17 to the separator 37 in which they are separated from the air which is by the action of the blower 47 likewise directed to the air heater 48 for recirculation.

The adjustment to a given particle size, as a limit between the two fractions, is effected by appropriate selection of the pressure difference between the zones 6 and 7, whereby the average value from the two negative pressures shall remain substantially constant and in accordance with the required general flow velocity of the drying medium, and also by adjustment of the partition 26. The adjustment of the partition 26 may in some situations suffice, making it unnecessary to change the speed of rotation of the blowers and, conversely, the adjustment of the blowers may suffice so that adjustment of the partition is made unnecessary. The means for adjusting the speed of rotation of the blowers and for adjusting the partition 26, respectively, may be of known and suitable kind throughout.

As noted before, there may be provided a regulation of the pressure difference depending upon the amounts of material to be treated. It is in such a case likewise possible, if the deviations from an adjusted desired value are not too great, to operate only with an adjustment of the partition 26. In such a case, deviations from the desired value would not be used as regulation values for the speed of rotation of the blowers, but for the adjustment of the partition, for example, by means of a servo motor. The means for effecting such regulations are well known and well understood in the art and have therefore been omitted in the drawings.

In the modification illustrated in FIG. 2, there are not provided any passages in the wall 3, but there is disposed in the central tube 2, approximately at a transverse line coinciding with the end of the first housing section, a choke or damper having flaps 8, 8' which are by suitable known means rotatable and can be spread about an axis 18 thus making it possible to vary the operatively effective cross-sectional area of the tube 2, as indicated in dash lines, nearly between zero and a maximum value. Suitable and approved means (not shown) may be provided for actuating the damper, the configuration of which may likewise be varied in ways known and well understood in the art. An increase in the cross-sectional effective area of the damper (spreading of the flaps 8, 8') will impede the flow of air, and less air will consequently reach the part of the tube 2 lying ahead of the damper, so that the amount of air flowing through the holes in the first housing section increases correspondingly. As mentioned before, the action effected by this measure is less efficient than the action obtained by the first described measure.

Changes may be made within the scope and spirit of the appended claims which define what is believed to be new and desired to have protected by Letters Patent.

I claim:

1. A device for drying lightweight loose material, comprising an elongated drum-like housing, hopper means at one end of said housing for feeding material to be dried to the section of said housing lying first in material conveying direction, an elongated rotating tubular member extending within said housing centrally axially thereof, the diameter of said tubular member diminishing progressively from the material feed end toward the discharge end of said housing and the wall of said tubular member being provided substantially throughout its length with holes formed therein, conduit means at the feed end of said housing for supplying a stream of air for axial inflow into said tubular member at the wide end thereof and outflow therefrom, through the holes formed in the wall thereof, into the surrounding space of said housing to which the material to be dried is fed from said hopper means, whereby the material fed into said housing is along a helical path transported therethrough toward the discharge end, means for diverting an adjustable amount of the stream of air supplied to said tubular member, for flow into said first section of said housing, whereby the material transport speed is accelerated in said first housing section, means at the discharge end of said housing for discharging coarse material particles downwardly from the bottom portion thereof, and suction controlled means adjacent the upper portion of said housing for upwardly removing from said housing the remaining material particles.

2. A device according to claim 1, comprising separator means for receiving said remaining material particles for separation thereof from the air, and means for recirculating the air in a closed cyclic circuit.

3. A device according to claim 1, comprising means forming a first suction zone, subjected to relatively low negative pressure, for upwardly removing material particles up to a given particle size, and means forming directly adjacent said first zone, a second suction zone, subjected to a higher negative pressure, for upwardly removing other material particles except the coarse particles which are downwardly discharged.

4. A device according to claim 1 wherein the means for diverting adjustable amounts of air comprises a damper disposed within said tubular member along a transverse line coinciding approximately with the inner end of said first material conveying section of said housing, and means for adjusting the operatively effective cross-sectional area of said damper.

5. A device for drying lightweight loose material, comprising an elongated drum-like housing, hopper means at one end of said housing for feeding material to be dried to the section of said housing lying first in material conveying direction, an elongated rotating tubular member extending within said housing centrally axially thereof, the diameter of said tubular member diminishing progressively from the material feed and toward the discharge end of said housing and the wall of said tubular member being provided substantially throughout its length with holes formed therein, conduit means at the feed end of said housing for supplying a stream of air for axial inflow into said tubular member at the wide end thereof and outflow therefrom, through the holes formed in the wall thereof, into the surrounding space of said housing to which the material to be dried is fed from said hopper means, whereby the material fed into said housing is along a helical path transported therethrough toward the discharge end, means for diverting an adjustable amount of the stream of air supplied to said tubular member, for flow into said first section of said housing, whereby the material transport speed is accelerated in said first housing section, said diverting means comprising an annular wall extending radially about the wide end of said tubular member to which is supplied an air stream, said wall defining the rearward end of the operatively effective material conveying of said housing and forming with the corresponding end wall of said housing a chamber through which is supplied the stream of air, holes formed in said wall constituting passages extending from said chamber into the space of said housing which surrounds said tubular member, means for adjusting the flow of the diverted air through said holes, means at the discharge end of said housing for downwardly discharging coarse material particles, and suction controlled means for upwardly removing from said housing the remaining material particles.

6. A device according to claim 5, wherein said wall is rotatable with said tubular member.

7. A device for drying lightweight loose material, comprising an elongated drum-like housing, hopper means at one end of said housing for feeding material to be dried to the section of said housing lying first in material conveying direction, an elongated rotating tubular member extending within said housing centrally axially thereof, the diameter of said tubular member diminishing progressively from the material feed end toward the discharge end of said housing and the wall of said tubular member being provided substantially throughout its length with holes formed therein, conduit means at the feed end of said housing for supplying a stream of air for axial inflow into said tubular member at the wide end thereof and outflow therefrom, through the holes formed in the wall thereof, into the surrounding space of said housing to which the material to be dried is fed from said hopper means, whereby the material fed into said housing is along a helical path transported therethrough toward the discharge end, means for diverting an adjustable amount of the stream of air supplied to said tubular member, for flow into said first section of said housing, whereby the material transport speed is accelerated in said first housing section, means at the discharge end of said housing for downwardly discharging coarse material particles, suction controlled means for upwardly removing from said housing the remaining material particles, said last mentioned means forming a first suction zone, subjected to relatively low negative pressure, for upwardly removing material particles up to a given particle size, means forming directly adjacent said first zone, a second suction zone, subjected to a higher negative pressure, for upwardly removing other material particles except the coarse particles which are downwardly discharged, a movable partition wall disposed between said suction zone, means for moving said partition wall laterally to itself so as to adjust the cross sectional area of the respective suction zones, and means for each suction zone, including a material separator for receiving material therefrom and for separating it from the air, and a blower for recirculating the air, the speed of rotation of the respective blowers being adjustable in accordance with the negative pressure obtaining in the corresponding suction zones.

References Cited by the Examiner

UNITED STATES PATENTS

| | | | |
|---|---|---|---|
| 1,979,602 | 11/1934 | Bojner | 34—135 X |
| 2,003,141 | 5/1935 | Dorfan | 209—150 |
| 2,446,140 | 7/1948 | McGee | 209—11 X |

FREDERICK L. MATTESON, Jr., *Primary Examiner.*

WILLIAM F. O'DEA, *Examiner.*

C. R. REMKE, *Assistant Examiner.*